United States Patent
Kobayashi et al.

(10) Patent No.: US 12,231,947 B2
(45) Date of Patent: Feb. 18, 2025

(54) PRIORITY CONTROL APPARATUS, PRIORITY CONTROL METHOD, AND NON-TRANSITORY COMPUTER-READABLE STORAGE MEDIUM STORING PROGRAM

(71) Applicant: NEC Corporation, Tokyo (JP)

(72) Inventors: Kosei Kobayashi, Tokyo (JP); Anan Sawabe, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 369 days.

(21) Appl. No.: 17/770,735

(22) PCT Filed: Nov. 6, 2019

(86) PCT No.: PCT/JP2019/043407
§ 371 (c)(1),
(2) Date: Apr. 21, 2022

(87) PCT Pub. No.: WO2021/090383
PCT Pub. Date: May 14, 2021

(65) Prior Publication Data
US 2022/0408304 A1 Dec. 22, 2022

(51) Int. Cl.
*H04W 28/02* (2009.01)
*H04L 47/24* (2022.01)
(Continued)

(52) U.S. Cl.
CPC ......... *H04W 28/0268* (2013.01); *H04L 47/24* (2013.01); *H04L 47/805* (2013.01); *H04L 47/822* (2013.01); *H04W 28/20* (2013.01)

(58) Field of Classification Search
CPC ..... H04L 47/24; H04L 47/805; H04L 47/822; H04W 28/0268; H04W 28/20
See application file for complete search history.

(56) References Cited

U.S. PATENT DOCUMENTS

2003/0142858 A1 7/2003 Ofuji et al.
2012/0214529 A1 8/2012 Ohta et al.
(Continued)

FOREIGN PATENT DOCUMENTS

JP 3246380 B 1/2002
JP 3786935 B 6/2006
(Continued)

OTHER PUBLICATIONS

International Search Report for PCT Application No. PCT/JP2019/043407, mailed on Jan. 7, 2020.
(Continued)

*Primary Examiner* — Stephen J Clawson

(57) ABSTRACT

A priority control apparatus includes: load information acquisition part which acquires communication load information per priority at relay apparatus that controls allocation of communication resources relative to individual communication depending on a priority that is set for the individual communication between two or more communication apparatuses; communication quality acquisition part which acquires communication quality as to control target communication; and priority control part which calculates a first priority, with which communication quality as to the control target communication can satisfy a predetermined condition, by using a mathematical model that indicates a relationship between a piece of communication load information before a priority as to the control target communication is set as the first priority and a communication quality when the priority as to the control target communication concerned is set as the first priority, and which sets the calculated first priority as the priority of the control target communication concerned.

15 Claims, 11 Drawing Sheets

(51) Int. Cl.
*H04L 47/70* (2022.01)
*H04L 47/80* (2022.01)
*H04W 28/20* (2009.01)

(56) References Cited

U.S. PATENT DOCUMENTS

| | | | |
|---|---|---|---|
| 2014/0269281 A1* | 9/2014 | Hussain | H04W 28/0289 |
| | | | 370/230 |
| 2015/0271861 A1* | 9/2015 | Li | H04W 76/14 |
| | | | 455/552.1 |
| 2017/0245123 A1* | 8/2017 | Baek | H04W 4/90 |
| 2019/0059021 A1* | 2/2019 | Corroy | H04W 36/22 |

FOREIGN PATENT DOCUMENTS

| | | |
|---|---|---|
| JP | 3828431 B | 10/2006 |
| JP | 2007-221318 A | 8/2007 |
| JP | 2007-228148 A | 9/2007 |
| JP | 2012-015667 A | 1/2012 |
| JP | 2014-509457 A | 4/2014 |
| JP | 2014-127837 A | 7/2014 |
| JP | 2017-130884 A | 7/2017 |
| JP | 2019-169783 A | 10/2019 |

OTHER PUBLICATIONS

English translation of Written opinion for PCT Application No. PCT/JP2019/043407, mailed on Jan. 7, 2020.
Marcus Haferkamp et al., "Payload-Size and Deadline-Aware Scheduling for Time-critical Cyber Physical System", TU Dortmund University, Wireless Days, 2017, pp. 1-4.

* cited by examiner

PRIORITY CONTROL APPARATUS, PRIORITY CONTROL METHOD, AND NON-TRANSITORY COMPUTER-READABLE STORAGE MEDIUM STORING PROGRAM

This application is a National Stage Entry of PCT/JP2019/043407 filed on Nov. 6, 2019, the contents of all of which are incorporated herein by reference, in their entirety.

FIELD

The present invention relates to a priority control apparatus, a priority control method, and a program.

BACKGROUND

In the field of communication, priority control is known as a method for effectively using limited network resources.

In the field of mobile communication, as to this priority control, various kinds of methods have been proposed as scheduling techniques at base stations. For example, Non Patent Literature (NPL) 1 discloses a technique of determining a priority of an individual communication based on "a remaining time before an allowable delay per application" and "a remaining data size". Also, Patent Literature (PTL) 1 discloses a communication method in which, regardless of a previously set priority, channels can be assigned flexibly depending on, for example, the situation in which packets are transmitted. Concretely, PTL1 discloses adding a weight to a priority, for example, based on a transfer rate at which a packet is transmitted to a mobile station, the length of time that a base station holds a packet since its acquisition of the packet, an elapsed time since transmission of a packet from a terminal apparatus and the like.

Further, there have been proposed many methods for controlling priority by transmission terminals. For example, PTL2 discloses a method for setting priorities in a network which provides both a best-effort type packet forwarding service and a packet forwarding service that guarantees a forwarding bandwidth and a forwarding delay. More Concretely, in the case of a high priority communication, at first, a terminal apparatus disclosed in PTL2 transmits packets with a low priority. Next, if it is predicted that quality deterioration (packet loss) will not occur even if the low priority is changed to a high priority, the terminal apparatus disclosed in PTL2 sets the priority to the high priority. As this quality deterioration prediction method, PTL2 discloses calculating a total traffic amount of high priority communications and predicting quality deterioration based on whether or not this total amount exceeds a wired link bandwidth.

Furthermore, PTL3 discloses a method for preventing traffic increase by monitoring a packet communication amount or packet communication quality and by performing packet transmission control based on the monitoring result and consequently improving the entire throughput. More concretely, if deterioration in communication quality is estimated, a terminal apparatus disclosed in PTL3 lowers the priority of a certain communication flow to perform an operation to ensure the communication quality of another communication flow. In addition, PTL3 discloses raising the priority of a certain communication flow to ensure the communication quality of this communication flow.

PTL1: JP3828431B2
PTL2: JP3246380B2
PTL3: JP3786935B2

NPL1: Marcus Haferkamp, Benjamin Sliwa, Christoph Ide and Christian Wietfeld, "Payload-Size and Deadline-Aware Scheduling for Time-critical Cyber Physical System", TU Dortmund University, 2017

SUMMARY

The following analysis has been given by the present inventors. The methods disclosed in the above NPL 1 and PTL 1 are premised on the presence of a base station, and a scheduler of the base station needs to be modified, so these methods have a problem that the application field is limited. Also, according to the methods disclosed in PTLs 2 and 3, although a terminal changes a priority, it is difficult to accurately predict quality deterioration, and the methods have a problem in that there is a high possibility that quality deterioration will occur due to inappropriate priority settings.

It is an object of the present invention to provide a priority control apparatus, a priority control method, and a program that contribute to optimization of a priority that is set for a control target communication without modification of a scheduler or the like of a base station.

According to a first aspect, there is provided a priority control apparatus, comprising: a load information acquisition part which acquires communication load information per priority at a relay apparatus that controls allocation of communication resources relative to an individual communication, depending on a priority that is set for the individual communication between two or more communication apparatuses; a communication quality acquisition part which acquires communication quality as to a control target communication; and a priority control part which calculates a first priority, with which a communication quality as to the control target communication can satisfy a predetermined condition, by using a mathematical model that indicates a relationship between a piece of communication load information before a priority as to the control target communication is set as the first priority and a communication quality when the priority as to the control target communication concerned is set as the first priority, and which sets the calculated first priority as the priority of the control target communication concerned.

According to a second aspect, there is provided a priority control method, comprising: acquiring communication load information per priority at a relay apparatus that controls allocation of communication resources relative to an individual communication, depending on a priority that is set for the individual communication between two or more communication apparatuses; acquiring communication quality as to a control target communication; and calculating a first priority, with which a communication quality as to the control target communication can satisfy a predetermined condition, by using a mathematical model that indicates a relationship between a piece of communication load information before a priority as to the control target communication is set as the first priority and a communication quality when the priority as to the control target communication concerned is set as the first priority, and which sets the calculated first priority as the priority of the control target communication concerned. The present method is associated with a certain machine referred to as a priority control apparatus that sets a priority of a control target communication concerned.

According to a third aspect, there is provided a computer program for realizing the function of the above priority control apparatus. This program can be inputted to a computer apparatus via an input device or a communication interface from the outside, stored in a storage device, cause a processor to drive in accordance with predetermined steps or processings, and display, as needed, a processing result including an intermediate state per stage on a display device or communicate with the outside via the communication interface. For example, the computer apparatus for this purpose typically comprises: a processor; a storage device; an input device; a communication interface, and a display device as needed, which can be connected to each other via a bus. Also, this program can be recorded in a computer-readable (non-transitory) storage medium.

According to the present invention, it is possible to provide a priority control apparatus, a priority control method, and a program that contribute to optimization of a priority that is set for a control target communication with a simple configuration.

PREFERRED MODES

Figure 1:
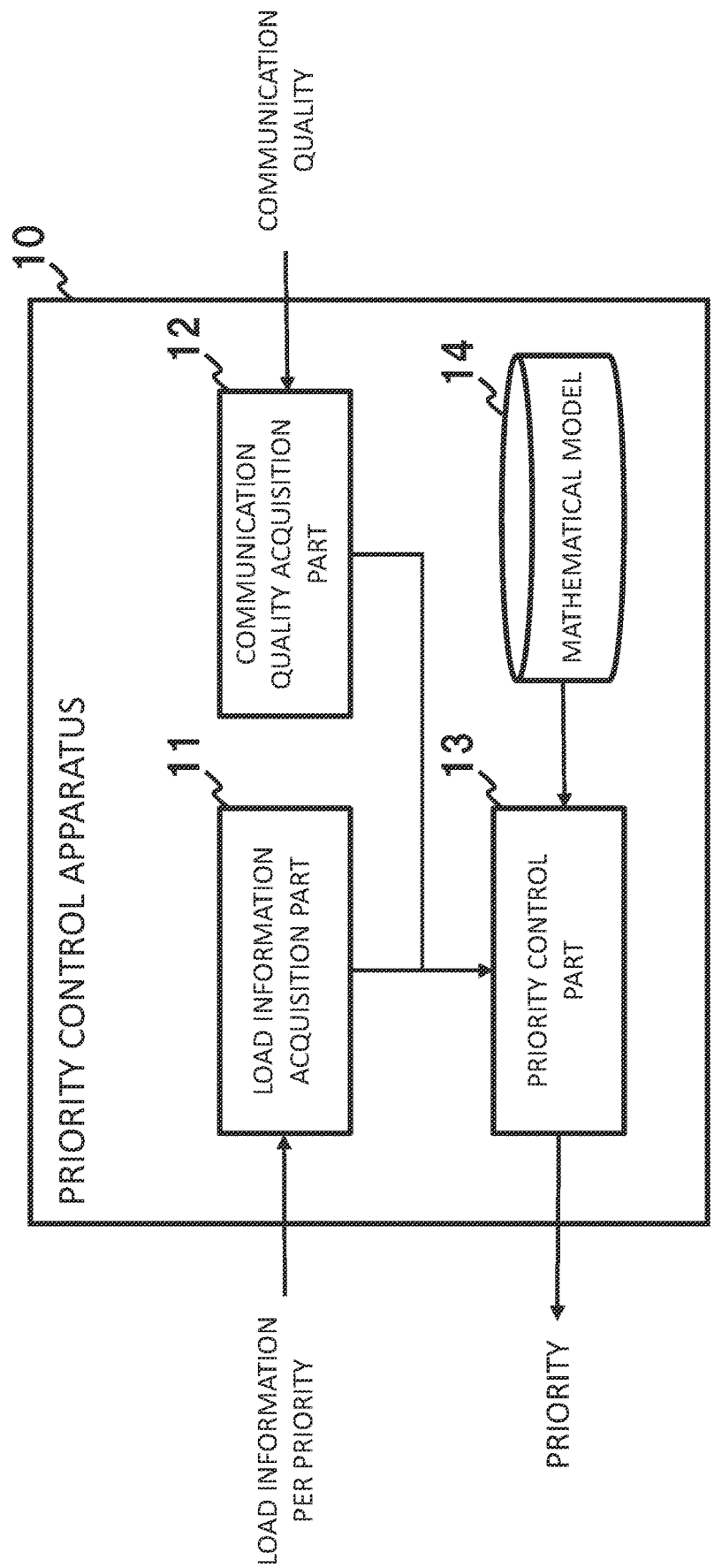
FIG. 1 is a diagram illustrating a configuration according to an example embodiment of the present invention.

First, an outline of an example embodiment of the present invention will be described with reference to drawings. It should be noted that drawing reference signs attached in the following outline is attached to each element for convenience as an example to facilitate understanding of the present invention and are not intended to limit the present invention to the illustrated aspects. Also, an individual connection line between blocks in the drawings, etc. referred to in the following description signifies both one-way and two-way directions. An one way arrow schematically illustrates a principal signal (data) flow and does not exclude bidirectionality. A program is executed via a computer apparatus, and the computer apparatus comprises, for example, a processor, a storage device, an input device, a communication interface, and as needed, a display device. Further, this computer apparatus is configured such that the computer apparatus can communicate with its internal device or an external node (including a computer) via the communication interface in a wired or wireless manner. Furthermore, although a port or an interface is present at an input/output connection point of an individual block in the relevant drawings, illustration of the port or the interface is omitted. In addition, in the following description, "A and/or B" signifies "A and B" or "A or B".

As illustrated in FIG. 1, an example embodiment of the present invention can be realized by a priority control apparatus 10 comprising: a load information acquisition part 11; a communication quality acquisition part 12; and a priority control part 13.

More concretely, the load information acquisition part 11 acquires communication load information per priority at a relay apparatus (for example, a base station in a mobile network) that controls allocation of communication resources relative to an individual communication, depending on a priority that is set for the individual communication between two or more communication apparatuses.

The communication quality acquisition part 12 acquires communication quality as to a control target communication. As this communication quality, a network QoS (Quality of Service) that indicates packet transmission quality may be used. As the network QoS, for example, a packet loss rate, a packet delay, a jitter, a throughput, a reorder rate or the like may be used. Alternatively, as this communication quality, for example, a QoE (Quality of Experience) that indicates quality of user's experience may be used.

The priority control part 13 calculates a priority (or priorities), with which a communication quality as to the control target communication can satisfy a predetermined condition, by using a mathematical model 14 and sets the priority as the priority of the control target communication. This mathematical model 14 is a model that indicates a relationship between a piece of communication load information before a priority as to the control target communication is set to a predetermined value and a communication quality when the priority as to the control target communication is set as the predetermined value. By inputting various parameters (for example, the communication load information per priority) to the mathematical model 14, it is possible to determine, in a case where the priority as to the control target communication is set as the predetermined value, whether or not the communication quality as to the control target communication can satisfy the predetermined condition.

When the priority control apparatus 10 having the above configuration acquires the communication load information per priority, the priority control part 13 calculates a priority that needs to be set for the control target communication by using the mathematical model 14. In this way, the priority that is set for the control target communication can be optimized.

First Example Embodiment

Figure 2:
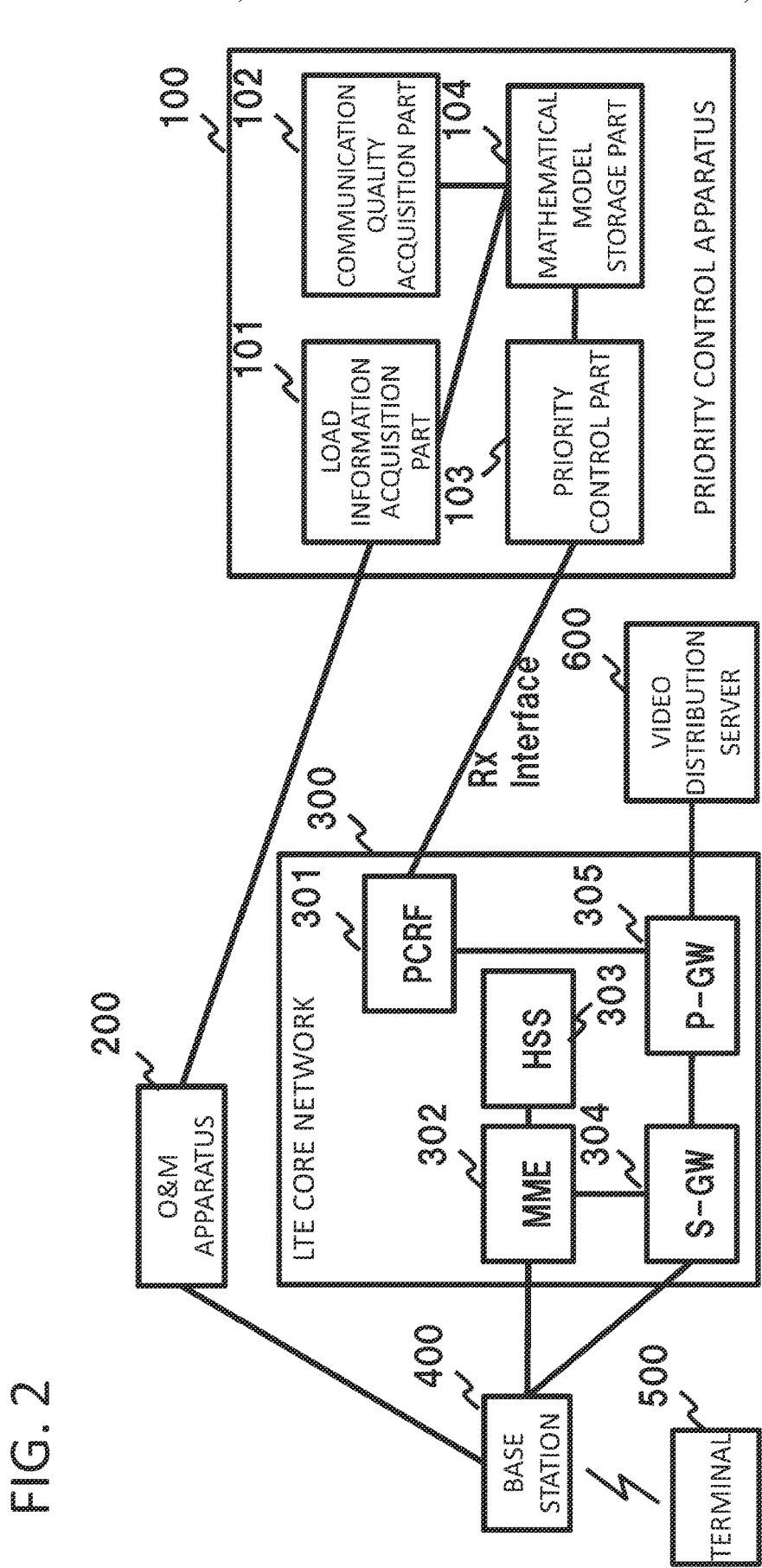
FIG. 2 is a diagram illustrating a configuration of a communication system including a priority control apparatus according to a first example embodiment of the present invention.

Next, a first example embodiment of the present invention will be described in detail with reference to drawings, wherein the first example embodiment is applied to a PS-LTE (Public Safety-LTE) system that provides communication services for Public Safety. FIG. 2 is a drawing illustrating a configuration of a communication system including a priority control apparatus according to the first example embodiment of the present invention. LTE is an abbreviation of Long Term Evolution.

As illustrated in FIG. 2, a priority control apparatus 100 is added to a PS-LTE system including an LTE core network 300, a base station 400, and an O&M apparatus 200.

The O&M apparatus 200 is an apparatus also called an Operation and Maintenance apparatus. In the present example embodiment, the O&M apparatus 200 is an apparatus taking on a role to provide the priority control apparatus 100 with (communication) load information per priority at the base station 400, which is a relay apparatus. In place of the O&M apparatus, an apparatus taking on a function to monitor or manage the base station 400, e.g., an OAM (Operation, Administration and Maintenance) apparatus, an NMS (Network Management System) apparatus, or an EMS (Element Management System) apparatus, may be used.

The LTE core network 300 includes a PCRF 301, an MME 302, an HSS 303, an S-GW 304, and a P-GW 305 and may be referred to as EPC (Evolved Packet Core). The PCRF 301 is an abbreviation of Policy and Charging Rules Function and is a node taking on a function to control for the QoS of user data and billing. The MME 302 is an abbreviation of Mobility Management Entity and is a node for registering the location of a terminal 500 and performing mobility management such as calling and handover between base stations. The HSS 303 is an abbreviation of Home Subscriber Server; manages user information; and provides the user information in response to a request from the MME 302. The S-GW 304 is an abbreviation of Serving GateWay and is a gateway for handling user data. The P-GW 305 is an abbreviation of Packet data network GateWay and is a gateway for connection to an external network such as the Internet. In the example in FIG. 2, while the PCRF 301 is located in the LTE core network 300, the PCRF 301 may be located outside the LTE core network 300.

The base station 400 constitutes a wireless network referred to as E-UTRAN (Evolved Universal Terrestrial Radio Access Network). In the present example embodiment, this base station 400 functions as a relay apparatus that controls allocation of communication resources relative to an individual communication.

The terminal 500 is a terminal used by a police official, a fire defense official, or the like using PS-LTE. The terminal 500 may comprise an application for distributing a video to a video distribution server 600 or receiving a video distributed from the video distribution server 600. Also, the terminal 500 may comprise a function of transmitting a network QoS (Quality of Service) indicating packet transmission quality of a video distribution communication, such as information about a packet loss rate, a packet delay, a jitter, a throughput, or a reorder rate, in accordance with a predetermined protocol.

The video distribution server 600 is a server that transmits a streaming video in response to a request from the terminal 500 or receives a streaming video uploaded by the terminal 500. The video distribution server 600 may be configured as an apparatus different from the terminal 500 or the priority control apparatus 100 or may be configured as a part of the terminal 500 or the priority control apparatus 100.

The priority control apparatus 100 comprises a load information acquisition part 101, a communication quality acquisition part 102, a priority control part 103, and a mathematical model storage part 104. The connection mode of the priority control apparatus 100 with respect to the other apparatuses is not limited to the mode illustrated in FIG. 2 or may be the other connection mode. For example, the priority control apparatus 100 may be located as a proxy server that relays communications between the LTE core network 300 and the video distribution server 600.

The load information acquisition part 101 acquires a load state per priority at the base station 400, as communication load information indicating a communication load status. The present example embodiment will be described assuming that the load information acquisition part 101 acquires a predetermined load state among an active user number and a Resource Block (RB) usage rate per QCI (QoS Class Identifier) from the O&M apparatus 200, as the load state per priority. Values defined as "PRB usage per traffic class" and "Number of Active UEs in the DL/UL per QCI" in 3GPP TS 36.314 may be used as the RB usage rate and active user number. The load information acquisition part 101 may acquire the following information defined in 3GPP TS 36.314 as the load state.

packet delay (Packet Delay in the DL per QCI)
packet loss rate (Packet Discard Rate in the DL per QCI, Packet Uu Loss Rate in the DL per QCI, Packet Loss Rate in the UL per QCI) The communication load information is not limited to the above information. Any information directly or indirectly indicating the communication load may be used as the communication load information, wherein the communication load information includes a usage rate of a processing device such as a CPU, a usage rate of a queue or a memory, a data amount in a queue or a memory, an incoming communication amount (an incoming data amount), and a usage rate of a communication line bandwidth.

Figure 3:
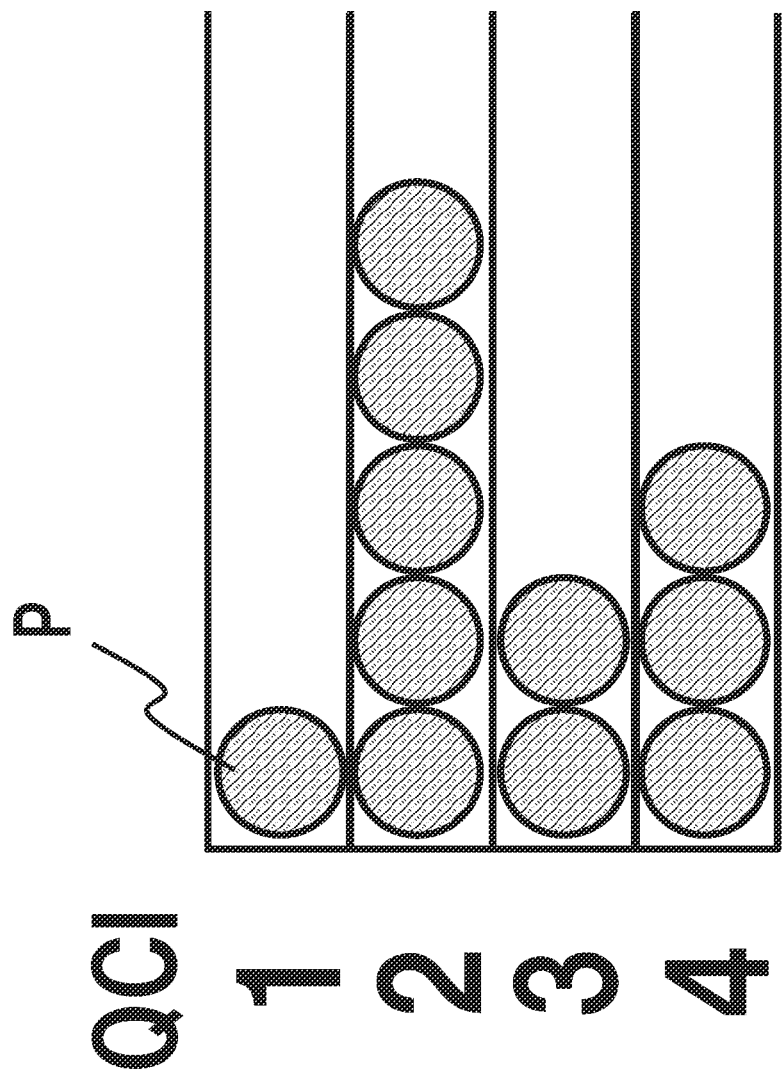
FIG. 3 is a drawing for explaining load information acquired by the priority control apparatus according to the first example embodiment of the present invention.

FIG. 3 is a diagram for explaining load information acquired by the priority control apparatus according to the first example embodiment of the present invention. Numerical values "1" to "4" in FIG. 3 indicate QCIs. Also, a reference sign "P" in FIG. 3 represents a packet. In the example in FIG. 3, QCI=2 represents high load, and QCI=1 represents low load. Although 1 to 4 are used as the QCIs, this is only an example. The present invention is not limited to this example. All QCIs defined in 3GPP may be used. Alternatively, only QCIs for GBR or Non-GBR may be used.

The communication quality acquisition part 102 acquires the communication quality as to a control target communication. As the communication quality, a network QoS (Quality of Service) indicating packet transmission quality, e.g., a packet loss rate, a packet delay, a jitter, a throughput, a reorder rate, or the like, may be used. The communication quality acquisition part 102 acquires a network QoS about the control target communication from the terminal 500, for example, by using RTCP (Real-time Transport Control Protocol). Alternatively, as the communication quality, a QoE (Quality of Experience) indicating the quality of the user's experience may be used. For example, as a method for evaluating the QoE of a video, an evaluation method (Full Reference method) based on direct comparison with a reference video, an evaluation technique (Reduced Reference method) using feature amounts extracted from a reference video, or an evaluation method (No Reference method) using only the evaluation video may be used. Alternatively, as a method for evaluating the QoE, a method of estimating the QoE from the above network QoS may be adopted. For example, the QoE may be evaluated by using a packet loss rate "L", a jitter "G", a reorder rate "R" and calculating $\alpha L+\beta G+\gamma R$ where $\alpha$, $\beta$, and $\gamma$ are predetermined constants.

The mathematical model storage part 104 stores a mathematical model in which a relationship between "a load state per QCI at a relay apparatus (the base station 400)" and "the communication quality as to a control target communication when the QCI of the control target communication is changed from X to Y under the load state concerned" is modeled. In the present example embodiment, a mathematical model (a learner) is created by performing machine learning using training data with a teacher.

Figure 4:
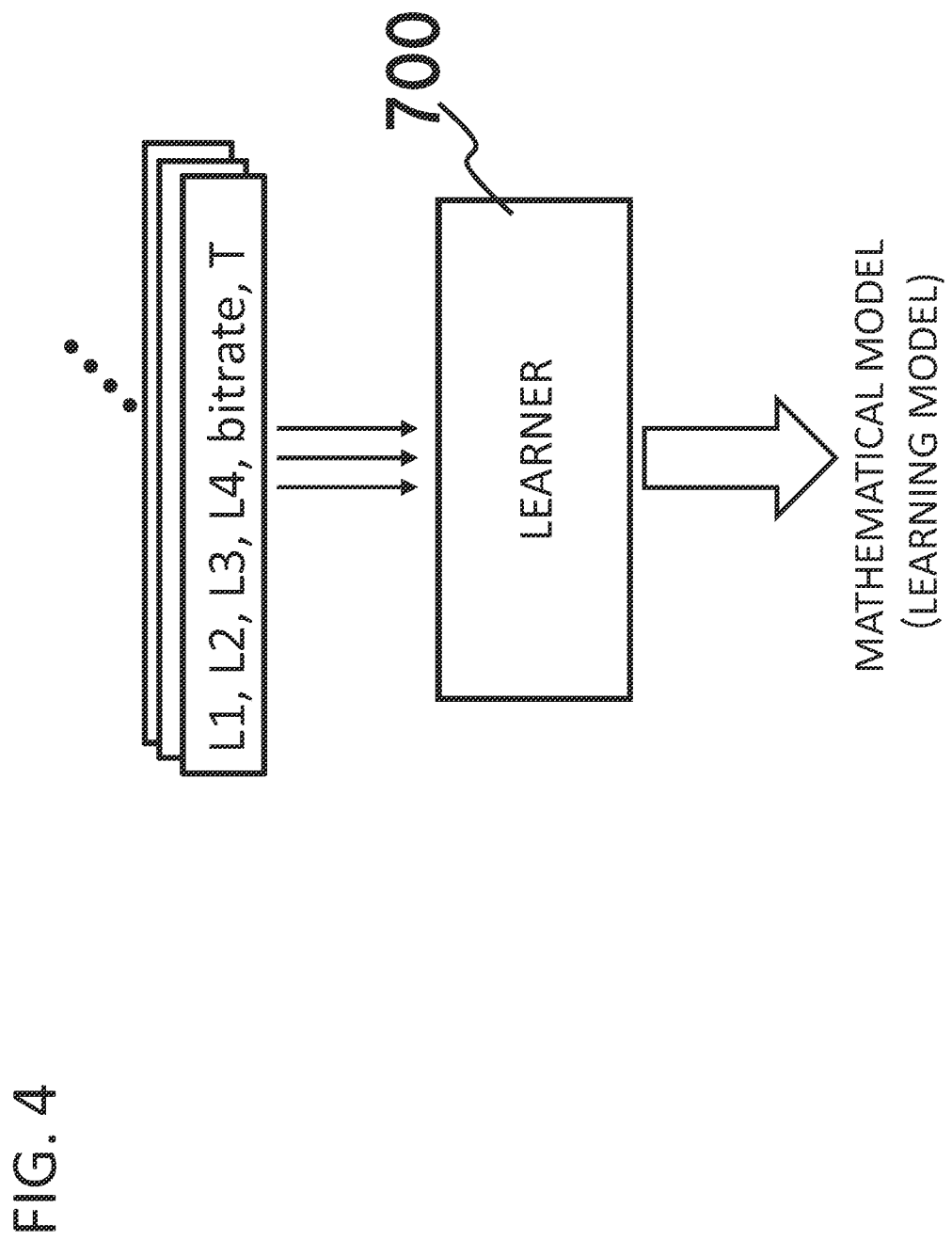
FIG. 4 is a diagram for explaining a method for generating a mathematical model used in the first example embodiment of the present invention.

FIG. 4 is a diagram for explaining a method (a learning phase) for generating a mathematical model used in the first example embodiment of the present invention. In the example in FIG. 4, a learner 700 generates a mathematical model by using training data configured by feature data including L1, L2, L3, L4, and a bitrate and a teacher label (T). Here, L1, L2, L3, and L4 are numerical values indicating load states of the QCIs=1 to 4. Also, "bitrate" is a bit rate of a watched video distribution communication (or a video distribution communication that could be used as a control target) and is used as a feature amount of the control target communication. Further, the learner 700 may be a learner using Gaussian Naive Bayes, random forest, SVM (Support vector machine), or a neural network.

Figure 5:
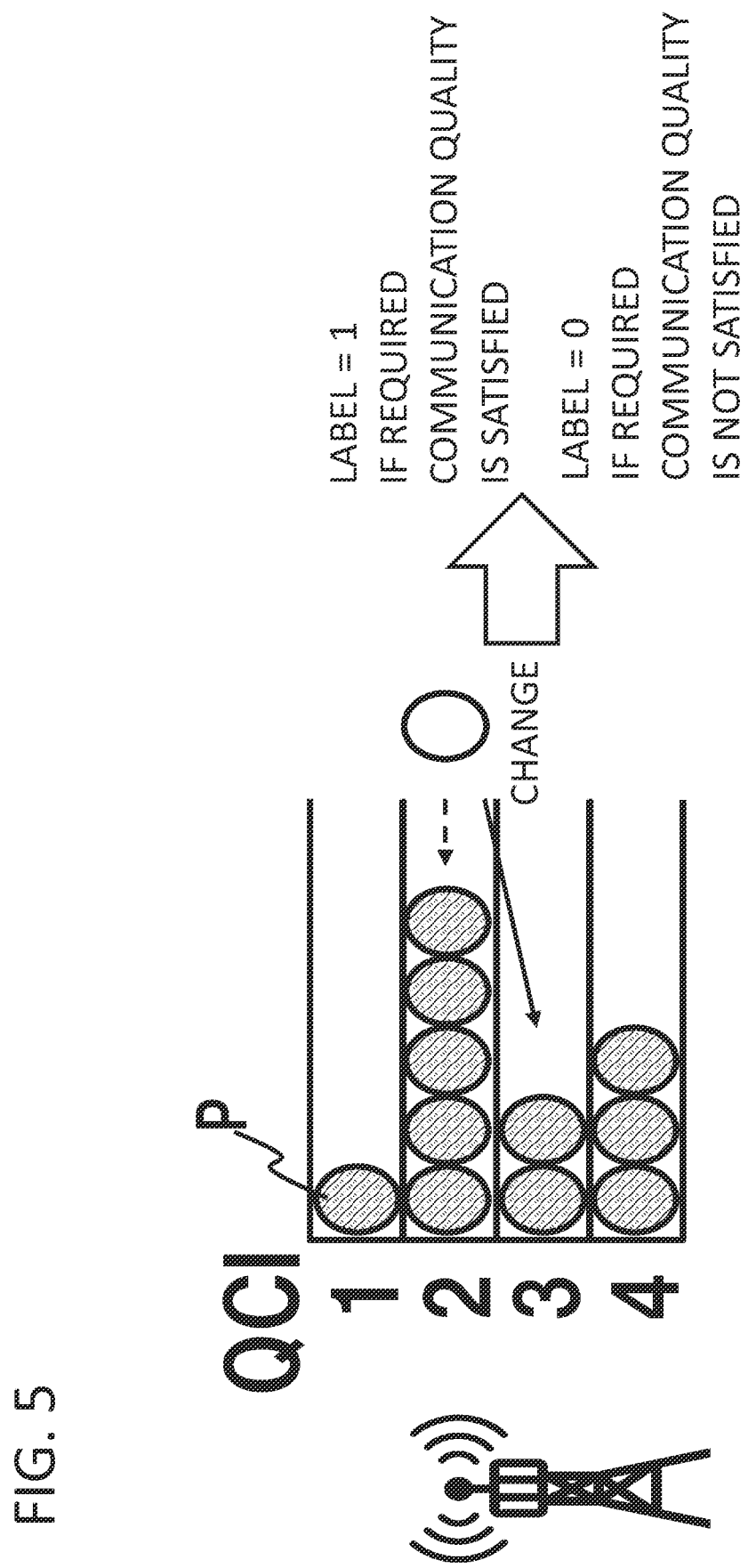
FIG. 5 is a diagram illustrating an example of teaching data for generating the mathematical model used in the first example embodiment of the present invention.

FIG. 5 is a drawing illustrating an example of training data for generating the mathematical model used in the first example embodiment of the present invention. For example, under the load state illustrated in FIG. 3 (FIG. 5), if the communication quality of a certain communication can satisfy a predetermined condition (required communication quality) after the QCI of the certain communication is changed from X to Y (for example, after the QCI of a communication represented by a white circle in FIG. 5 is changed from 2 to 3), 1 (changeable) is set as the teacher label (T). In contrast, if the communication quality of the certain communication cannot satisfy the predetermined condition (required communication quality) after the QCI of the certain communication is changed from X to Y (for example, after the QCI of the communication represented by the white circle in FIG. 5 is changed from 2 to 3), 0 (unchangeable) is set as the teacher label (T). A mathematical model is generated by using such training data, whereby it is possible to obtain a high accurate prediction result of whether or not required communication quality can be satisfied after the QCI of a certain communication is changed from X to Y under the load state illustrated in FIG. 3, for example. As the teacher label addition method, although the above description assumes that a different teacher label is set depending on whether or not the required communication quality can be satisfied, alternatively, a different teacher label may be set depending on whether or not the communication quality can be improved. Also, the training data can be created by actually changing priorities on an actual communication system and collecting communication quality and communication load information per priority. Further, instead of using an actual communication system, the training data may be created by using a simulator in which the communication system is modeled and by changing a priority (or priorities) in the simulator.

In addition, in the present example embodiment, in order to generate a mathematical model with a smaller number of training data (data sets, data records), a learner (a mathematical model) is prepared per priority (QCI) and per control direction (priority increase direction or decrease direction). Thus, to use for the priority control of a communication for which a priority "N" is set, a learner (a mathematical model) for a priority increase direction and a learner (a mathematical model) for a priority decrease direction are prepared. Of course, if the priority "N" is an upper limit value, a learner (a mathematical model) for the priority increase direction does not need to be prepared. Also, if the priority "N" is a lower limit value, a learner (a mathematical model) for the priority decrease direction does not need to be prepared.

If a control target communication (for example, a video distribution communication) satisfies required communication quality under the current load status of the relay apparatus, the priority control part 103 determines, by using the above mathematical model, whether to maintain the status satisfying the required communication quality even after the priority is lowered. As a result of the determination, if the priority control part 103 determines that it is possible to maintain a status satisfying a required communication quality, the priority control part 103 lowers the priority as to the control target communication. Also, if a control target communication (for example, a video distribution communication) does not satisfy a required communication quality under a current load status of the relay apparatus, the priority control part 103 may determine whether or not to satisfy the required communication quality by raising the priority as to the control target communication. As a result of the determination, if the priority control part 103 determines that it is possible to satisfy the required communication quality, the priority control part 103 raises the priority as to the control target communication.

In this way, in a case where the priority of the control target communication is a first priority, if the communication quality of the control target communication satisfies a predetermined condition, the priority control part 103 can obtain a lowest priority from among second priorities that can satisfy required communication quality by using the mathematical model.

In the present example embodiment, for example, the priority control part 103 gives an instruction about change of a priority via Rx-Interface, which is a standard interface of the PCRF 301. Thus, in the present example embodiment, the base station 400 does not need to be modified to a scheduler. The priority instructed to the PCRF 301 via Rx-Interface may be information capable of converting to a priority, other than the priority. As the information capable of converting to the priority, for example, the above QCI and media information (a media type) may be used.

Figure 6:
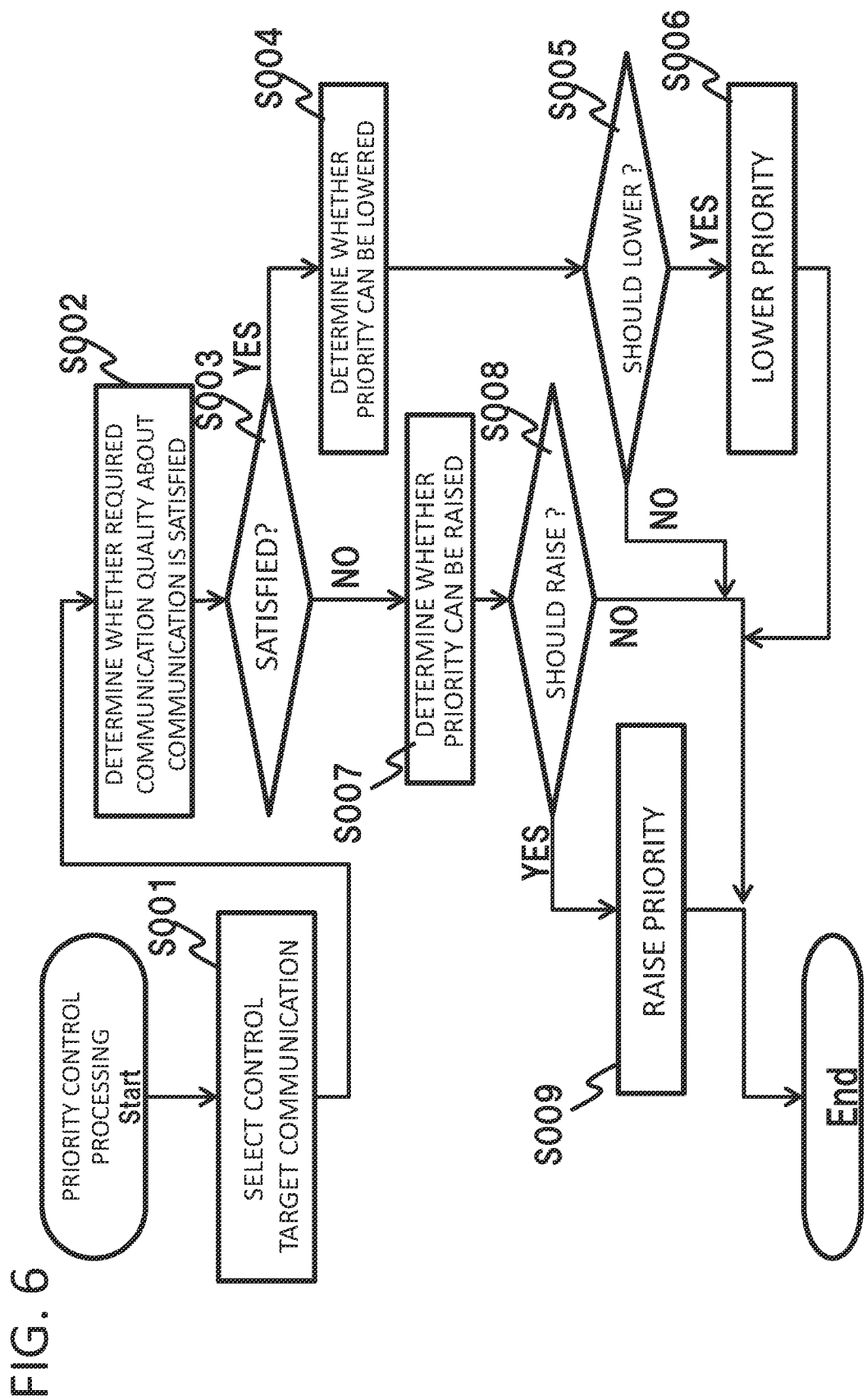
FIG. 6 is a flowchart illustrating an example of an operation of the priority control apparatus according to the first example embodiment of the present invention.

Next, an operation of the present example embodiment will be described in detail with reference to drawings. FIG. 6 is a flowchart illustrating an example of an operation of the priority control apparatus 100 according to the first example embodiment of the present invention. As illustrated in FIG. 6, first, the priority control apparatus 100 selects a control target communication (step S001). The following description assumes that the priority control apparatus 100 selects a video distribution communication transmitted from the video distribution server 600 to the terminal 500 as the control target communication. Of course, the control target communication may be a communication other than the video distribution communication.

Next, about this communication, the priority control apparatus 100 refers to the communication quality acquired by the communication quality acquisition part 102 and determines whether or not a required communication quality is satisfied (steps S002 and S003).

As a result of the determination, if the priority control apparatus 100 determines that the communication quality satisfies the required communication quality, the priority control apparatus 100 determines whether or not the priority can be lowered by using a mathematical model (steps S004 and S005). Concretely, the priority control apparatus 100 inputs feature data including (communication) load information per priority acquired from the load information acquisition part 101 and the bit rate of the video distribution communication as a control target to a mathematical model and obtains a determination result indicating whether or not to maintain the status satisfying the required communication quality even after the priority of the control target communication is lowered. As the mathematical model used herein, a mathematical model for determining whether or not the priority of the control target communication can be lowered is used.

If the determination result indicates that the status satisfying the required communication quality about the control target communication can be maintained even after the priority is lowered (Yes in step S005), the priority control apparatus 100 lowers the priority of the control target communication (step S006). In contrast, if the determination result indicates that the required communication quality about the control target communication cannot be satisfied after the priority is lowered, the priority control apparatus 100 does not change the priority of the control target communication (No in step S005).

In step S003, if the priority control apparatus 100 determines that the communication quality does not satisfy the required communication quality, the priority control apparatus 100 determines whether or not the priority can be raised by using a mathematical model (steps S007 and S008). Concretely, the priority control apparatus 100 inputs feature data including (communication) load information per priority acquired from the load information acquisition part 101 and the bit rate of the video distribution communication as the control target to a mathematical model and obtains a determination result indicating whether or not the required communication quality can be satisfied after the priority of the control target communication is raised. As the mathematical model used herein, a mathematical model for determining whether or not the priority of the control target communication can be raised is used. As the mathematical model used herein, a mathematical model for determining whether or not the communication quality can be improved by raising the priority of the control target communication may alternatively be used.

If the determination result indicating that the required communication quality about the control target communication can be satisfied by raising the priority is obtained (Yes in step S008), the priority control apparatus 100 raises the priority of the control target communication (step S009). In contrast, if the determination result indicates that the required communication quality about the control target communication cannot be satisfied even after the priority is raised, the priority control apparatus 100 does not change the priority of the control target communication (No in step S008).

As described above, the priority control apparatus 100 according to the present example embodiment can accurately predict a communication quality after changing priority and can set an appropriate priority to a control target communication without modifying the relay apparatus (the base station) side. Also, this priority control apparatus 100 is suitably applicable to PS-LTE whose available frequency range is narrower than that of a general private commercial LTE. More concretely, it is also possible to set optimum priorities as to communications for which required communication quality need to be ensured, such as for a distribution of a video from a disaster or accident site to command headquarters or a distribution of an aerial video captured by a drone (UAV: Unmanned Aerial Vehicle) to squad officials, among various communications exchanged by PS-LTE.

Second Example Embodiment

Figure 7:
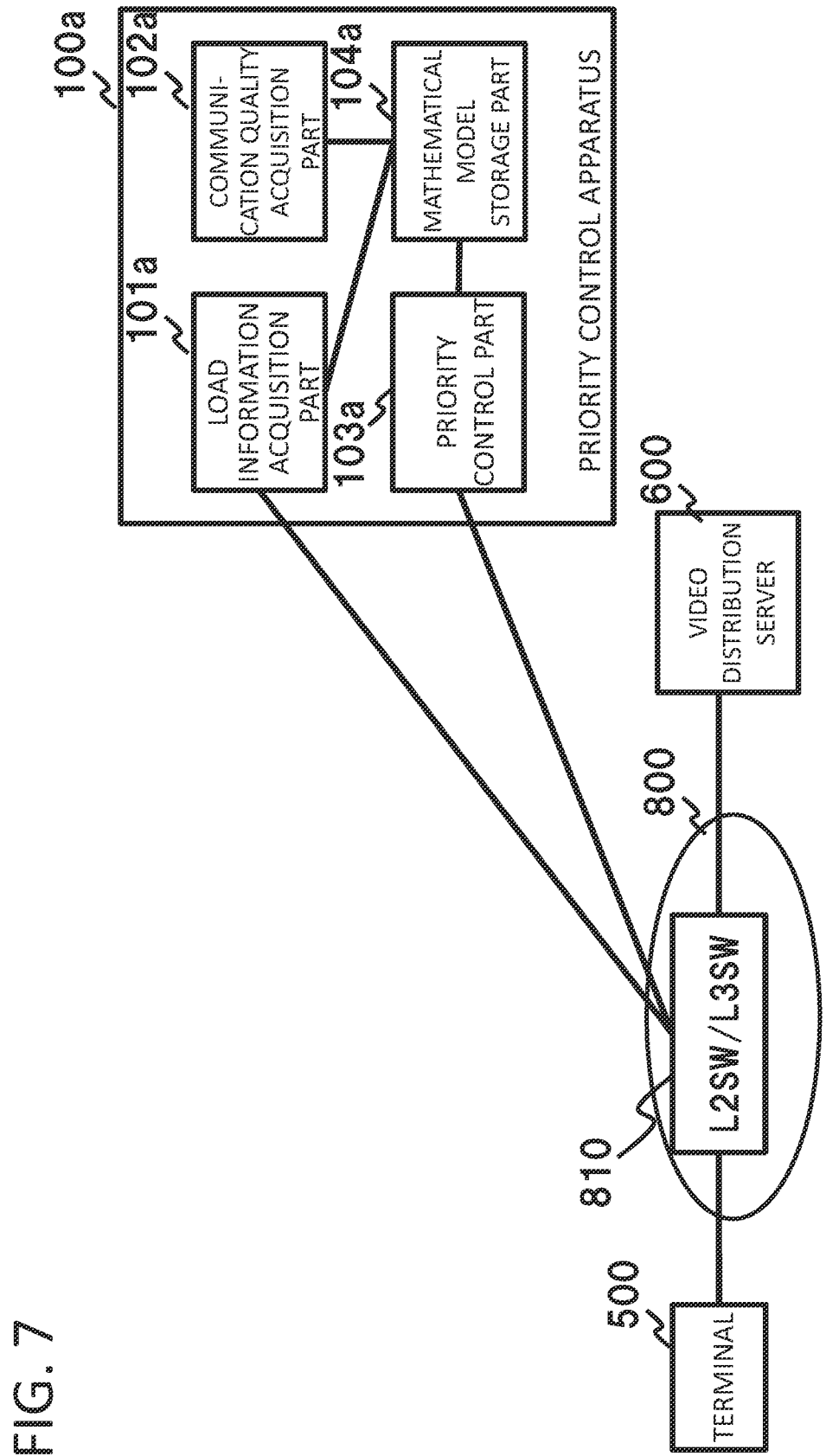
FIG. 7 is a diagram illustrating a configuration of a communication system including a priority control apparatus according to a second example embodiment of the present invention.

Although the above first example embodiment assumes that the present invention is applied to PS-LTE, the present invention is applicable not only to LTE but also to other wireless communication systems and wired communication systems. Next, a second example embodiment in which the present invention is applied to a wired communication system will be described. FIG. 7 is a drawing illustrating a configuration of a communication system including a priority control apparatus according to the second example embodiment of the present invention. Since a priority control apparatus 100a has the same basic configuration as that according to the first example embodiment, the following description will be made with a focus on the difference.

FIG. 7 illustrates a configuration in which a terminal 500 and a video distribution server 600 are connected to each other via a network 800 comprising a layer-2 switch (L2SW) and/or a layer-3 switch (L3SW) 810. Also, the priority control apparatus 100a is connected to the L2SW/L3SW 810. The L2SW/L3SW 810 connected to the priority control apparatus 100a is a relay apparatus comprising a priority control function. The priority control function may be realized by a data link layer or may be realized by a network layer or a transport layer. For example, priority control may be performed by using a PCP (Priority Code Point) in a VLAN tag field defined by IEEE802.11p. Alternatively, the priority control may be performed by using a DSCP (Differentiated Services Code Point) or an IP Precedence set in a TOS (Type of Service) field in an IP header. As concrete examples of the priority control, classification, queuing, scheduling, and the like in accordance with the priority may be used. For example, the L2SW/L3SW 810 prepares a queue per priority and classifies a received packet into an appropriate queue depending on a priority that is set for the packet. Further, the L2SW/L3SW 810 extracts packets stored in the individual queues in accordance with a predetermined scheduling scheme (for example, weighted round-robin) and transmits the extracted packets to the next apparatus.

It is preferable that the L2SW/L3SW 810 be a node located on the terminal side in the network 800 (in an access network if the network 800 is configured by the access network and a core network). Also, as in the first example embodiment, the priority control apparatus 100a may be located as a proxy server that relays communications between the network 800 and the video distribution server 600.

The priority control apparatus 100a comprises a load information acquisition part 101a, a communication quality acquisition part 102a, a priority control part 103a, and a mathematical model storage part 104a.

The load information acquisition part 101a acquires a load state per priority at the L2SW/L3SW 810. The present example embodiment is based on an assumption that the load information acquisition part 101a acquires at least one of a queue usage rate, a packet delay, a packet loss rate, an Incoming communication amount, and an Outgoing communication amount of an individual queue of the L2SW/L3SW 810.

The communication quality acquisition part 102a acquires, as communication load information, the communication quality as to a control target communication. As in the first example embodiment, too, a network QoS indicating packet transmission quality or a QoE indicating the quality of the user's experience may be used as the communication quality in the present example embodiment.

The mathematical model storage part 104a stores a mathematical model in which a relationship between "a load state per priority at a relay apparatus (the L2SW/L3SW 810)" and "the communication quality as to a control target communication when the priority of the control target communication is changed from X to Y under the load state" is modeled. In the present example embodiment, a mathematical model (a learner) is created by performing machine learning using training data with a teacher.

If the required communication quality about the control target communication (for example, a video distribution communication) is satisfied under a current load status of the relay apparatus (the L2SW/L3SW 810), the priority control part 103a determines whether or not to maintain the status satisfying the required communication quality even after the priority of the control target communication is lowered by using the above mathematical model. If the determination result indicates that the status satisfying the required communication quality can be maintained, the priority control part 103a lowers the priority as to the control target communication. Also, if the required communication quality about the control target communication (for example, a video distribution communication) is not satisfied under the current load status of the relay apparatus (the L2SW/L3SW 810), the priority control part 103a may determine whether or not to satisfy the required communication quality by raising the priority as to the control target communication. If the determination result indicates that the required communication quality can be satisfied by raising the priority, the priority control part 103a raises the priority as to the control target communication. If the required communication quality about the control target communication (for example, a video distribution communication) is not satisfied under the current load status of the relay apparatus (the L2SW/L3SW 810), the priority control part 103a may determine whether or not the communication quality can be improved by raising the priority as to the control target communication. In this case, if the priority control part 103a determines that the communication quality can be improved, the priority control part 103a may raise the priority as to the control target communication.

For example, a PCP in a VLAN tag field or a DSCP or an IP Precedence set in a TOS field in an IP header, which have been described above, may be used as the priority controlled by the priority control part 103a.

Since an operation according to the present example embodiment is the same as that according to the first example embodiment, description thereof will be omitted. As seen from the operation of the individual part of the above priority control apparatus 100a, the present invention is suitably applicable to setting of a priority (or priorities) at a relay apparatus in a wired communication system.

Third Example Embodiment

Figure 8:
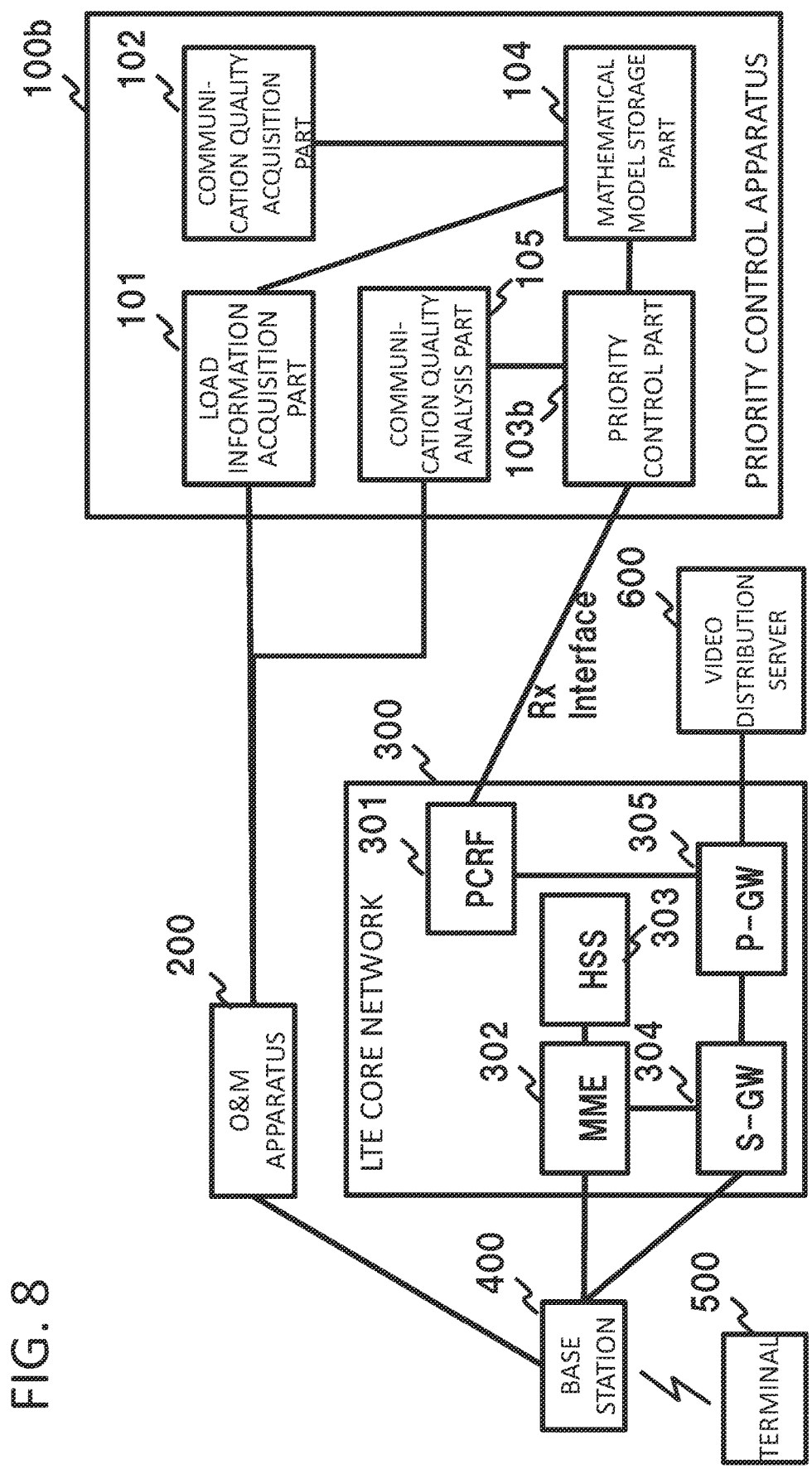
FIG. 8 is a diagram illustrating a configuration of a communication system including a priority control apparatus according to a third example embodiment of the present invention.

Next, a third example embodiment will be described. In the third example, a communication quality analysis function that analyzes communication quality by using a queuing theory is added to the above priority control apparatus. FIG. 8 is a drawing illustrating a configuration of a communication system including a priority control apparatus according to the third example embodiment of the present invention. Since a priority control apparatus 100b comprises the same basic configuration as that according to the first example embodiment, the following description will be made with a focus on the difference.

As illustrated in FIG. 8, the priority control apparatus 100b comprises a load information acquisition part 101, a communication quality acquisition part 102, a priority control part 103b, a mathematical model storage part 104, and a communication quality analysis part 105.

The communication quality analysis part 105 analyzes the communication quality of a queue per priority provided at the relay apparatus based on a queuing theory. The communication quality to be analyzed is, for example, an average packet delay, an average packet loss rate, or an average waiting packet number, of the individual queue.

The priority control part 103b determines the priority of a control target communication, based on both of the communication quality analyzed by the communication quality analysis part 105 and the communication quality prediction result obtained by the mathematical model stored in the mathematical model storage part 104.

Figure 9:
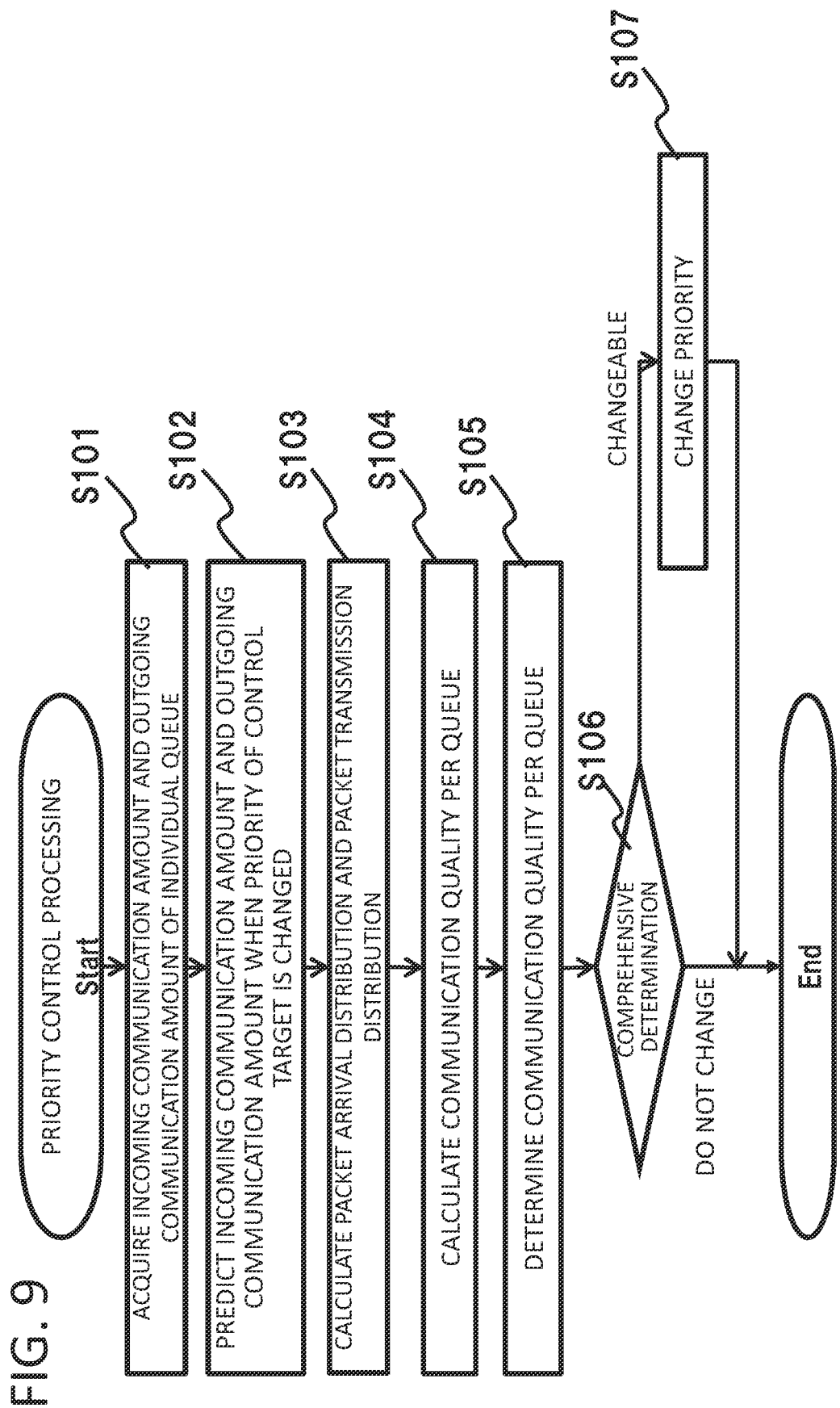
FIG. 9 is a flowchart illustrating an example of an operation according to the third example embodiment of the present invention.

Next, an operation according to the present example embodiment will be described in detail with reference to drawings. FIG. 9 is a flowchart illustrating an example of an operation according to the third example embodiment of the present invention. The communication quality analysis part 105 acquires the communication amount of communications (Incoming communications) that arrive at an individual queue per-priority of the relay apparatus (the base station 400) and the communication amount of communications (Outgoing communications) that are transmitted from the individual queue per priority (step S101). The Incoming communication amounts and the Outgoing communication amounts may be acquired from the relay apparatus (the base station 400) or from the O&M apparatus 200. Also, if the priority control apparatus 100b is located as a proxy server that relays the communications between the LTE core network 300 and the video distribution server 600, the priority control apparatus 100b may measure the Incoming communication amount and the Outgoing communication amount of the individual queue per priority at the relay apparatus (the base station 400). In this case, the priority control apparatus 100b may manage a correspondence relation (a relationship) between the communication packets relayed by the priority control apparatus 100b, the relay apparatus (the base station 400) through which the communication packets travel, and the priorities set in the communication packets. For example, the priority control apparatus 100b may manage a correspondence relation (a relationship) between transmission destination information and/or transmission source information about communication packets, the relay apparatus (the base station 400) through which the communication packets travel, and the priorities.

Based on the acquisition result of the Incoming communication amount and the Outgoing communication amount of the individual queue per priority, the communication quality analysis part 105 predicts the Incoming communication amount and the Outgoing communication amount of the individual queue per priority in a case of assuming that a priority of certain communication is changed (step S102). As an example, the following case is considered, the following case being a case where there are four queues per priority in the relay apparatus (the base station 400); the Incoming communication amount of queue 1 (priority 1) is V1; the Incoming communication amount of queue 2 (priority 2) is V2; the Incoming communication amount of queue 3 (priority 3) is V3; and the Incoming communication amount of queue 4 (priority 4) is V4. In this case, if the Incoming communication amount of the control target communication is set as Vt, it is possible to predict that the Incoming communication amounts of queues 1 to 4 when the priority of the control target communication is changed from priority 2 to priority 3 will be V1, V2−Vt, V3+Vt, and V4, respectively.

Based on the prediction result, the communication quality analysis part 105 calculates a packet arrival distribution and a packet transmission distribution par queue in a case of assuming that the above priority change is performed (step S103). In this case, a predetermined probability distribution may be assumed for each of the Incoming communications and Outgoing communications. For example, a Poisson distribution may be assumed for both of the Incoming communication and the Outgoing communication, and parameters of the probability distribution are calculated based on prediction results of the Incoming communication amount and the Outgoing communication amount. For example, in the case of a Poisson distribution, an average arrival rate and an average service time are calculated as parameters of the probability distribution.

The communication quality analysis part 105 calculates a communication quality per queue in a case of assuming that the above priority change is performed, by using the above probability distributions (step S104). Here, as the communication quality, for example, an average packet delay, an average packet loss rate, and an average waiting packet number per queue may be used. The communication quality may be calculated theoretically and analytically based on the probability distributions and calculated in accordance with a simulation method as represented by a Monte Carlo method or the like based on the probability distributions. Also, the communication quality analysis part 105 may calculate the QoE based on the communication quality such as an average packet delay, an average packet loss rate, an average waiting packet number, or the like. The communication quality analysis part 105 determines whether or not the calculated communication quality per queue in a case of assuming that the above priority change is performed can satisfy required communication quality (step S105).

The priority control part 103*b* determines the priority of the control target communication based on both of the communication quality determination result based on the mathematical model and the communication quality determination result obtained by the communication quality analysis part 105 (step S106; comprehensive determination). For example, if the control target communication (for example, a video distribution communication) satisfies the required communication quality under the current load status of the relay apparatus, the priority control part 103*b* determines whether or not to maintain the status that the required communication quality is satisfied even if the priority control part 103*b* lower the priority based on the mathematical model and the communication quality analysis part. If both of the determination results indicate that the status satisfying the required communication quality can be maintained ("changeable" in step S106), the priority control part 103*b* lowers the priority as to the control target communication (step S107). As another example, if the control target communication (for example, a video distribution communication) does not satisfy the required communication quality under the current load status of the relay apparatus, the priority control part 103*b* determines whether or not the required communication quality will be satisfied by raising the priority based on both of the mathematical model and the communication quality analysis part. If both of the determination results indicate that the required communication quality will be satisfied ("changeable" in step S106), the priority control part 103*b* raises the priority as to the control target communication (step S107). Otherwise, the priority control part 103*b* determines that the priority does not need to be changed ("do not change" in step S106) and does not change the priority.

As described above, according to the configuration with adding the communication quality analysis part 105, the priority control apparatus 100*b* can determine the priority of the control target communication based on both of the mathematical model and the communication quality analysis part 105. According to the present example embodiment, the prediction accuracy of the communication quality can be improved even in a case where the number of training data is small and a high accurate mathematical model cannot be generated.

Fourth Example Embodiment

Figure 10:
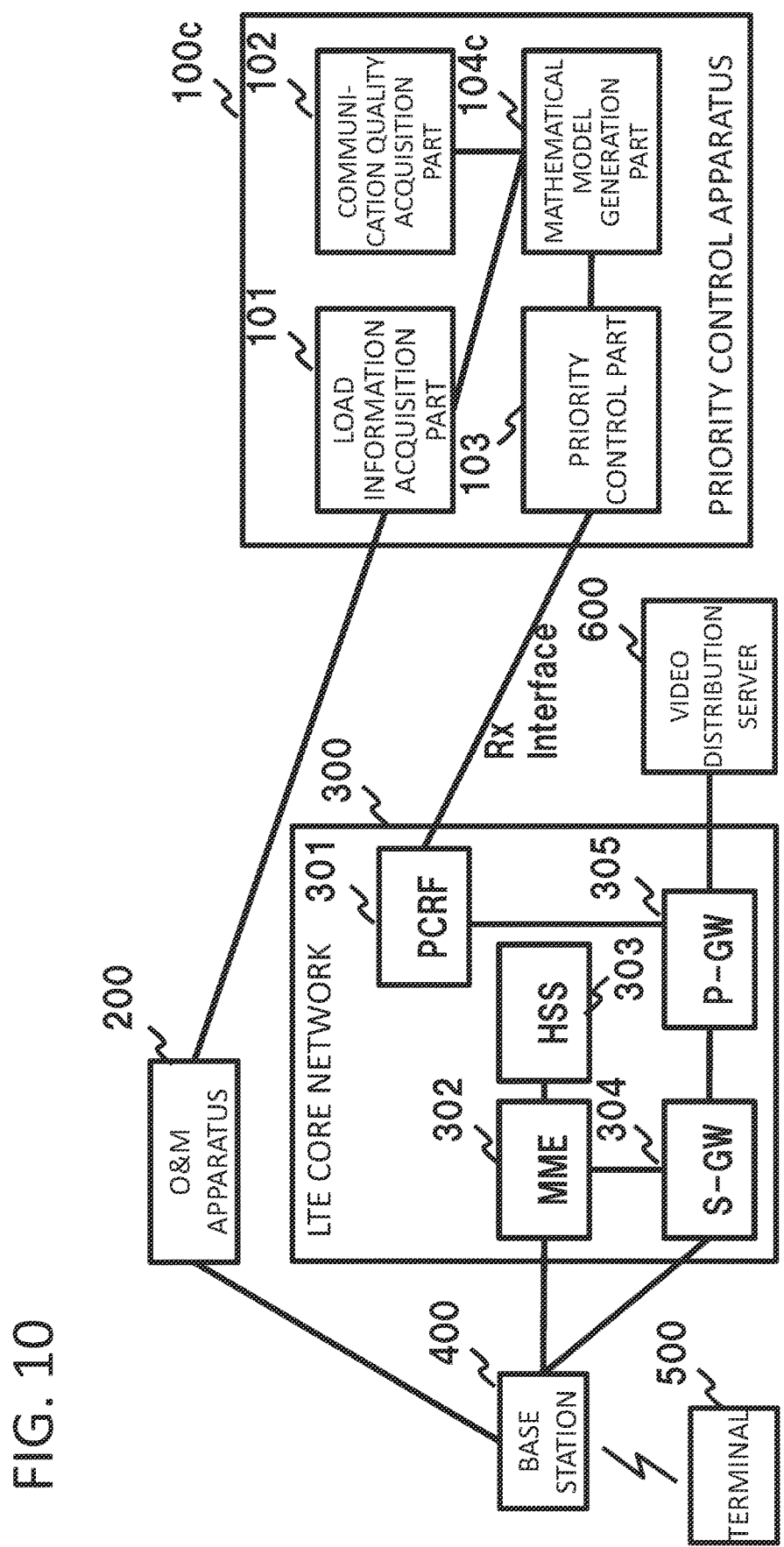
FIG. 10 is a diagram illustrating a configuration of a communication system including a priority control apparatus according to a fourth example embodiment of the present invention.

Next, a fourth example embodiment in which a mathematical model generation function is added to the above priority control apparatus will be described. FIG. 10 is a drawing illustrating a configuration of a communication system including a priority control apparatus according to the fourth example embodiment of the present invention. Since a priority control apparatus 100*c* has the same basic configuration as that according to the first example embodiment, the following description will be made with a focus on the difference.

The priority control apparatus 100*c* according to the fourth example embodiment differs from the priority control apparatus 100 according to the first example embodiment in that the priority control apparatus 100*c* comprises a mathematical model generation part 104*c* in place of the mathematical model storage part 104. The mathematical model generation part 104*c* is configured to include the learner 700 illustrated in FIG. 4 and generates a mathematical model from training data.

As described above, since the priority control apparatus 100*c* includes a mathematical model generation function, the priority control apparatus 100*c* can generate or update a mathematical model by using training data.

Although example embodiments of the present invention have thus been described, the present invention is not limited thereto. Further variations, substitutions, or adjustments can be made without departing from the basic technical concept of the present invention. For example, the configurations of the networks, the configurations of the elements, and the representation modes of the data illustrated in the drawings have been used only as examples to facilitate understanding of the present invention. That is, the present invention is not limited to the configurations illustrated in the drawings.

The present invention is not limited to the above example embodiments, and variations as will be described below can be made to the present invention.

[Learner (Mathematical Model) Configuration Method]

Although the above example embodiments have been described assuming that a learner (a mathematical model) is prepared per priority and per control direction, a learner (a mathematical model) may be prepared (provided) per priority. In this case, "a priority change amount" may be added to the feature data in the training data. When the priority as to a control target communication is changed from A to B, feature data including communication load information per priority and a priority change amount (=B−A) are inputted to a learner for the priority A, whereby it is possible to predict whether or not the communication quality as to the control target communication can satisfy the required communication quality when the priority is changed.

Still alternatively, instead of preparing a learner (a mathematical model) per priority, a configuration is possible in which a single learner (a mathematical model) is prepared as a whole. In this case, "a priority change amount" and "the current priority of the control target communication" may be added to the feature data in the training data. When the priority as to the control target communication is changed from A to B, feature data including communication load information per priority, a priority change amount (=B−A), and the current priority (=A) of the control target communication are inputted to the learner, whereby it is possible to predict whether or not the communication quality as to the control target communication can satisfy the corresponding required communication quality when the priority is changed.

Although the above example embodiments have been described assuming that the bit rate (the video bit rate) of a control target communication is used as feature data of the control target communication, in addition to the bit rate, all or any combination of encoding parameters such as a video frame rate, a GOP (Group of Picture) size, and a resolution may be included. In this way, a determination can be performed finer.

[Kinds of Control Target Communications]

Although the above example embodiments have been described assuming that a video distribution from the video distribution server 600 to the terminal 500 is used as a control target, any other communication(s) may also be used as a control target. For example, in addition to a streaming communication (for example: voice, music, broadcasting, etc.) other than a video, file transfer, WEB browsing, text chat, telephone, etc. can be used as control targets.

Also, the direction of a control target communication is not limited to a downlink direction (a communication from the video distribution server 600 to the terminal 500). The direction may be an uplink direction (a communication from the terminal 500 to the video distribution server 600). For example, the present invention is applicable to a priority control performed when a police official, a fire defense official, or the like uploads data captured at a site.

[Selection of Control Target Communication]

In step S001 in FIG. 6 in the above example embodiment, when there are a plurality of control target communications, a control target communication may be selected by using a certain rule. For example, a control target communication may be selected based on a degree of deviation of the communication quality from a predetermined communication quality and the communication amount. For example, a communication having a large communication amount (or a small communication amount) may be selected preferentially. Alternatively, a communication whose communication quality has a large degree of deviation (or a small degree of deviation) from a required communication quality may be selected preferentially.

Also, a selection reference of a control target communication may be changed, in accordance with when selecting a control target communication from among "communications whose communication quality satisfies required communication quality" or when selecting a control target communication from among "communications whose communication quality does not satisfy required communication quality". For example, when a control target communication is selected from among the "communications whose communication quality satisfies required communication quality", a communication whose communication amount is the largest or a communication whose communication quality deviation degree from the required communication quality is the largest in the positive direction is preferentially selected. In contrast, when a control target communication is selected from among the "communications whose communication quality does not satisfy required communication quality", a communication whose communication amount is the smallest or a communication whose communication quality deviation degree from the required communication quality is the smallest in the negative direction is preferentially selected.

Figure 11:
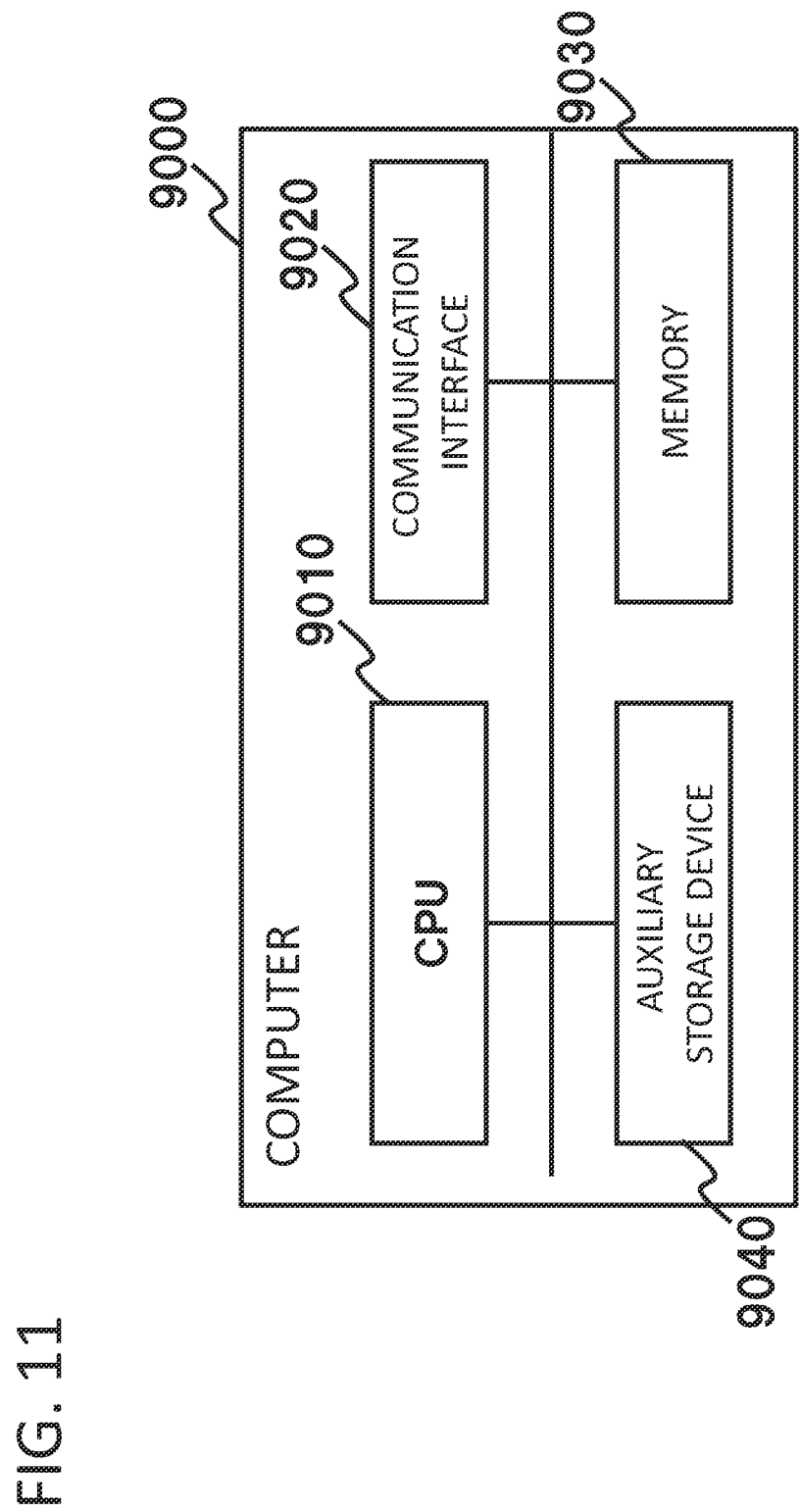
FIG. 11 is a diagram illustrating a configuration of a computer that constitutes the individual priority control apparatus of the present invention.

Further, each of the procedures described in the above first to fourth example embodiments can be realized by a program that causes a computer (9000 in FIG. 11) which functions as a corresponding one of the priority control apparatuses 100, 100a, 100b, and 100c to realize the function as the corresponding apparatus. This computer is illustrated as a configuration comprising, for example, a CPU (Central Processing Unit) 9010, a communication interface 9020, a memory 9030, and an auxiliary storage device 9040 in FIG. 11. That is, the CPU 9010 in FIG. 11 may execute the communication quality acquisition program and the priority control program to perform processing for updating various calculation parameters stored in the auxiliary storage device 9040, etc.

That is, the individual parts (processing means, functions) of the priority control apparatuses according to the above first to fourth example embodiments can each be realized by a computer program that causes a processor mounted on the corresponding apparatus to execute the corresponding processing as described above by using corresponding hardware.

Finally, suitable modes of the present invention will be summarized.

[Mode 1]

(See the priority control apparatus according to the above first aspect)

[Mode 2]

The mathematical model of the priority control apparatus may be a mathematical model which indicates a relationship between the communication quality when the priority of the control target communication is changed from a second priority being a current priority to the first priority and the communication load information when the second priority is set as the priority as to the control target communication concerned.

[Mode 3]

If the communication quality when the priority of the control target communication is the second priority satisfies the predetermined condition, the priority control part of the priority control apparatus may adopt a configuration calculating a priority lower than the second priority from among a plurality of the first priority whose communication quality can satisfy the predetermined condition, by using the mathematical model.

[Mode 4]

The mathematical model that the priority control apparatus refers to may be a mathematical model generated by way of machine learning, by using training data comprising feature data including at least communication load information per priority at the relay apparatus and a label indicating whether or not the communication quality as to the control target communication satisfies the predetermined condition when the priority of the control target communication is set as the first priority.

[Mode 5]

The priority control apparatus may further comprise a mathematical model generation part which generates the mathematical model.

[Mode 6]

The control target communication of the priority control apparatus may be streaming data transmitted by using a PS-LTE (Public Safety Long Term Evolution) network.

[Mode 7]

When there is a plurality of control target communications, the priority control part of the priority control apparatus may adopt a configuration selecting the control target communication based on at least one selected from the group consisting of a communication amount and a degree of deviation of a communication quality acquired by the communication quality acquisition part from the predetermined condition.

[Mode 8]

The priority control apparatus further may comprise a communication quality analysis part which, with respect to an individual queue provided per the priority, assumes a predetermined probability distribution for communication packets inputted to the individual queue and a predetermined probability distribution for communication packets outputted from the individual queue, and calculates for each queue at least one of an average packet delay, an average packet loss rate, and an average waiting packet number, based on a queuing theory, wherein the priority control part may calculate the first priority by using both the mathematical model and the communication quality analysis part and sets the calculated first priority as the priority of the control target communication.

[Mode 9]

(See the priority control method according to the above second aspect)

[Mode 10]

(See the computer program according to the above third aspect)

The above modes 9 and 10 can be expanded in the same way as mode 1 is expanded to modes 2 to 8.

The disclosure of each of the above PTLs and NPL is incorporated and described herein by reference thereto and may be used as the basis or a part of the present invention as needed. Modifications and adjustments of the example embodiments and examples are possible within the scope of the overall disclosure (including the claims) of the present invention and based on the basic technical concept of the present invention. Also, various combinations or selections (including partial deletion) of various disclosed elements (including the elements in each of the claims, example embodiments, examples, drawings, etc.) are possible within the scope of the disclosure of the present invention. That is, it is self-explanatory that the present invention includes various variations and modifications that could be achieved by those skilled in the art according to the overall disclosure including the claims and the technical concept. Particularly, as to any numerical ranges disclosed herein, any numerical values or subranges included in the ranges should be concretely described even if there is no clear description. Further, as needed and based on the gist of the present invention, as a part of the disclosure of the present invention, using partial or entire of the disclosure matters in combination with the described matters in the present application should be deemed also to be included in the disclosure matters of the present application.

REFERENCE SIGNS LIST 10, 100, 100a, 100b, 100c priority control apparatus
11, 101, 101a load information acquisition part
12, 102, 102a communication quality acquisition part
13, 103, 103a, 103b priority control part
14 mathematical model
104, 104a mathematical model storage part
104c mathematical model generation part
105 communication quality analysis part
200 O&M apparatus
300 LTE core network
301 PCRF
302 MME
303 HSS
304 S-GW
305 P-GW
400 base station
500 terminal
600 video distribution server
700 learner
800 network
810 L2SW/L3SW
9000 computer
9010 CPU
9020 communication interface
9030 memory
9040 auxiliary storage device
P packet

What is claimed is:

1. A priority control apparatus comprising:
a memory storing instructions; and
a processor configured to execute the instructions to:
acquire communication load information per priority at a relay apparatus that controls allocation of communication resources relative to an individual communication, depending on a priority that is set for the individual communication between two or more communication apparatuses;
acquire communication quality as to a control target communication; and
calculate a first priority, with which a communication quality as to the control target communication can satisfy a predetermined condition, by using a mathematical model that indicates a relationship between a piece of communication load information before a priority as to the control target communication is set as the first priority and a communication quality when the priority as to the control target communication concerned is set as the first priority, and set the calculated first priority as the priority of the control target communication, wherein
the mathematical model is a mathematical model which indicates a relationship between the communication quality when the priority of the control target communication is changed from a second priority being a current priority to the first priority and the communication load information when the second priority is set as the priority as to the control target communication.

2. The priority control apparatus according to claim 1, wherein, if the communication quality when the priority of the control target communication is the second priority satisfies the predetermined condition, the processor calculates a priority lower than the second priority from among a plurality of the first priority whose communication quality can satisfy the predetermined condition, by using the mathematical model.

3. The priority control apparatus according to claim 2, wherein the mathematical model is generated by way of machine learning, by using training data comprising feature data including at least communication load information per priority at the relay apparatus and a label indicating whether or not the communication quality as to the control target communication satisfies the predetermined condition when the priority of the control target communication is set as the first priority.

4. The priority control apparatus according to claim 3, wherein the processor is configured to execute the instructions to further generate the mathematical model.

5. The priority control apparatus according to claim 2, wherein the processor is configured to execute the instructions to further generate the mathematical model.

6. The priority control apparatus according to claim 2, wherein the control target communication is streaming data transmitted by using a PS-LTE (Public Safety Long Term Evolution) network.

7. The priority control apparatus according to claim 1, wherein the mathematical model is generated by way of machine learning, by using training data comprising feature data including at least communication load information per priority at the relay apparatus and a label indicating whether or not the communication quality as to the control target communication satisfies the predetermined condition when the priority of the control target communication is set as the first priority.

8. The priority control apparatus according to claim 7, wherein the processor is configured to execute the instructions to further generate the mathematical model.

9. The priority control apparatus according to claim 7, wherein the control target communication is streaming data transmitted by using a PS-LTE (Public Safety Long Term Evolution) network.

10. The priority control apparatus according to claim 1, wherein the processor is configured to execute the instructions to further generate the mathematical model.

11. The priority control apparatus according to claim 1, wherein the control target communication is streaming data transmitted by using a PS-LTE (Public Safety Long Term Evolution) network.

12. The priority control apparatus according to claim 1, wherein, when there is a plurality of control target communications, the processor selects the control target communication based on at least one selected from the group consisting of a communication amount and a degree of deviation of a communication quality acquired by the communication quality acquisition part from the predetermined condition.

13. The priority control apparatus according to claim 1, wherein the processor is configured to execute the instructions to further, with respect to an individual queue provided per the priority, assume a predetermined probability distribution for communication packets inputted to the individual queue and a predetermined probability distribution for communication packets outputted from the individual queue, and calculate for each queue at least one of an average packet delay, an average packet loss rate, and an average waiting packet number, based on a queuing theory.

14. A priority control method performed by a computer and comprising:
    acquiring communication load information per priority at a relay apparatus that controls allocation of communication resources relative to an individual communication, depending on a priority that is set for the individual communication between two or more communication apparatuses;
    acquiring communication quality as to a control target communication; and
    calculating a first priority, with which a communication quality as to the control target communication can satisfy a predetermined condition, by using a mathematical model that indicates a relationship between a piece of communication load information before a priority as to the control target communication is set as the first priority and a communication quality when the priority as to the control target communication concerned is set as the first priority, and setting the calculated first priority as the priority of the control target communication, wherein
    the mathematical model is a mathematical model which indicates a relationship between the communication quality when the priority of the control target communication is changed from a second priority being a current priority to the first priority and the communication load information when the second priority is set as the priority as to the control target communication.

15. A non-transitory computer-readable storage medium storing a program executable by a computer to perform processing comprising:
    acquiring communication load information per priority at a relay apparatus that controls allocation of communication resources relative to an individual communication, depending on a priority that is set for the individual communication between two or more communication apparatuses;
    acquiring communication quality as to a control target communication; and
    calculating a first priority, with which a communication quality as to the control target communication can satisfy a predetermined condition, by using a mathematical model that indicates a relationship between a piece of communication load information before a priority as to the control target communication concerned is set as the first priority and a communication quality when the priority as to the control target communication concerned is set as the first priority, and setting the calculated first priority as the priority of the control target communication, wherein
    the mathematical model is a mathematical model which indicates a relationship between the communication quality when the priority of the control target communication is changed from a second priority being a current priority to the first priority and the communication load information when the second priority is set as the priority as to the control target communication.

* * * * *